(12) United States Patent
Hiramatsu et al.

(10) Patent No.: US 11,515,610 B2
(45) Date of Patent: Nov. 29, 2022

(54) LAMINATED BODY HAVING A SUBSTRATE WITH AN ELECTRICAL CONDUCTOR THEREON THAT ASSOCIATED WITH A FUNCTIONAL LAYER

(71) Applicants: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

(72) Inventors: Tetsuya Hiramatsu, Tokyo (JP); Ryuta Sonoda, Tokyo (JP); Yoshiyuki Ikuma, Tokyo (JP); Masaki Horie, Tokyo (JP); Ryota Okuda, Tokyo (JP)

(73) Assignees: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

( * ) Notice: Subject to any disclaimer, the term of this patent is extended or adjusted under 35 U.S.C. 154(b) by 0 days.

(21) Appl. No.: 17/233,678

(22) Filed: Apr. 19, 2021

(65) Prior Publication Data
US 2021/0242553 A1    Aug. 5, 2021

Related U.S. Application Data

(63) Continuation of application No. PCT/JP2019/042379, filed on Oct. 29, 2019.

(30) Foreign Application Priority Data

Nov. 6, 2018 (JP) .............................. JP2018-209011

(51) Int. Cl.
*H01P 3/08* (2006.01)
*B32B 17/10* (2006.01)
(Continued)

(52) U.S. Cl.
CPC .............. *H01P 3/081* (2013.01); *B32B 17/10* (2013.01); *H01P 3/003* (2013.01); *H01Q 9/0407* (2013.01)

(58) Field of Classification Search
CPC ............................. H01P 3/081; H01P 11/003
(Continued)

(56) References Cited

U.S. PATENT DOCUMENTS

| 5,065,122 A * | 11/1991 | Juskey et al. ........... H01P 3/081 333/238 |
| 5,276,414 A * | 1/1994 | Fujimoto et al. ......... H01P 1/30 257/788 |

(Continued)

FOREIGN PATENT DOCUMENTS

| JP | 06-196915 A | 7/1994 |
| JP | 2006-287729 A | 10/2006 |

(Continued)

*Primary Examiner* — Benny T Lee
(74) *Attorney, Agent, or Firm* — Oblon, McClelland, Maier & Neustadt, L.L.P.

(57) ABSTRACT

The present invention relates to a laminated body with electric conductor including a substrate; a functional layer having at least an adhesive layer; an electric conductor; and a protective material, wherein the substrate, the functional layer having at least the adhesive layer, the electric conductor, and the protective material are sequentially laminated in a thickness direction, and wherein a thickness of the functional layer is less than or equal to 0.300 mm.

16 Claims, 6 Drawing Sheets

(51) Int. Cl.
*H01P 3/00* (2006.01)
*H01Q 9/04* (2006.01)

(58) Field of Classification Search
USPC .......................................... 333/238
See application file for complete search history.

(56) References Cited

U.S. PATENT DOCUMENTS

| | | | |
|---|---|---|---|
| 2006/0290438 A1* | 12/2006 | Greeff | H05K 3/28 |
| | | | 333/1 |
| 2015/0305142 A1 | 10/2015 | Matsuda | |
| 2016/0002099 A1 | 1/2016 | Manz et al. | |
| 2018/0206334 A1* | 7/2018 | Li et al. | H05K 3/0058 |

FOREIGN PATENT DOCUMENTS

| | | |
|---|---|---|
| JP | 2008-227720 A | 9/2008 |
| JP | 2011-066692 A | 3/2011 |
| JP | 2014-216449 A | 11/2014 |
| WO | WO 2008/058855 A1 | 5/2008 |

* cited by examiner

LAMINATED BODY HAVING A SUBSTRATE WITH AN ELECTRICAL CONDUCTOR THEREON THAT ASSOCIATED WITH A FUNCTIONAL LAYER

CROSS-REFERENCE TO RELATED APPLICATIONS

This U.S. non-provisional application is a continuation of PCT International Application PCT/JP2019/042379 filed on Oct. 29, 2019 and designated the U.S., which is based upon and claims priority to Japanese Patent Applications No. 2018-209011 filed on Nov. 6, 2018, with the Japan Patent Office. The entire contents of these applications are incorporated herein by reference.

TECHNICAL FIELD

The present invention relates to a laminated body with electric conductor.

BACKGROUND OF THE INVENTION

In recent years, progress is being made in the pursuit to use higher frequency bands such as the frequency bands for 4th Generation (4G) and 5th Generation (5G) mobile communication systems in order to increase the speed and capacity of wireless communications. Co-planer type transmission lines having electrical conductors (signal lines and ground lines) on one side of an insulating substrate, microstrip-type transmission lines having signal lines on one side of a substrate and ground lines on the other side, and the like are known as high-frequency transmission lines (also referred to as high-speed transmission lines) used in antennas, transmitters, receivers, and the like (see Patent Document 1 etc.).

Patent Document 2 discloses a three-layer radio wave transmissive body covering an antenna or a radio wave absorber. The three-layer radio wave transmissive body is configured from a first layer disposed on the outermost layer having a general surface finishing material, a second layer having a material containing relative dielectric constant of 1 to 1.5 such as air or a polystyrene foam, and a third layer having a low dielectric constant material such as acrylic resin, vinyl chloride resin, and the like.

RELATED-ART DOCUMENT

Patent Documents

Patent Document 1: Japanese Patent Application Laid-Open No. 2008-227720, published Sep. 25, 2008.
Patent Document 2: Japanese Unexamined Patent Application Laid-Open No. H06-196915, published Jul. 15, 1994.

SUMMARY OF THE INVENTION

Problems to be Solved by the Invention

Conventionally, such high-frequency transmission lines may be configured, for example, by laminating substrates and electric conductors by so-called "interlayers" such as polyvinyl butyral (PVB) or ethylene vinyl acetate (EVA). However, it is known that even the interlayer having the thinnest possible thickness is 0.37 mm. In manufacturing, the difference between the thinnest and thickest portion varies by about 10% compared to the catalog value. When this variation is large, there is a problem in that sufficient high-frequency transmission characteristics cannot be obtained because the directivity of the radio waves deteriorates or the operating frequency shifts occurs.

The present invention has been made in view of such circumstances, and an object of the present invention is to provide a laminated body with electric conductor that can obtain sufficient high-frequency transmission characteristics.

Means for Solving the Problem

A first aspect of the invention provides a laminated body with electric conductor including: a substrate; a functional layer having at least an adhesive layer; an electric conductor; and a protective material, wherein the substrate, the functional layer having at least the adhesive layer, the electric conductor, and the protective material are sequentially laminated in a thickness direction, and wherein a thickness of the functional layer is less than or equal to 0.300 mm.

A second aspect of the invention provides a laminated body with electric conductor including: a substrate having a first surface as a front surface and a second surface as a back surface; a first functional layer having at least a first adhesive layer; a first electric conductor; a first protective material; a second functional layer having at least a second adhesive layer; a second electric conductor; and a second protective material, wherein the first functional layer having at least the first adhesive layer, the first electric conductor, and the first protective material are sequentially laminated in a thickness direction to the first surface of the substrate, wherein the second functional layer having at least the second adhesive layer, the second electric conductor, and the second protective material are sequentially laminated in a thickness direction to the second surface of the substrate, and wherein a thickness of the first functional layer is less than or equal to 0.300 mm and a thickness of the second functional layer is less than or equal to 0.300 mm.

EFFECT OF THE INVENTION

According to the present invention, a laminated body with electric conductor is capable of providing sufficient high-frequency transmission characteristics.

DETAILED DESCRIPTION OF THE INVENTION

Hereinafter, a preferred embodiment of a laminated body with electric conductor according to the present invention will be described in accordance with the accompanying drawings, where like features are denoted by the same reference labels throughout the drawings and detailed description.

Figure 1:
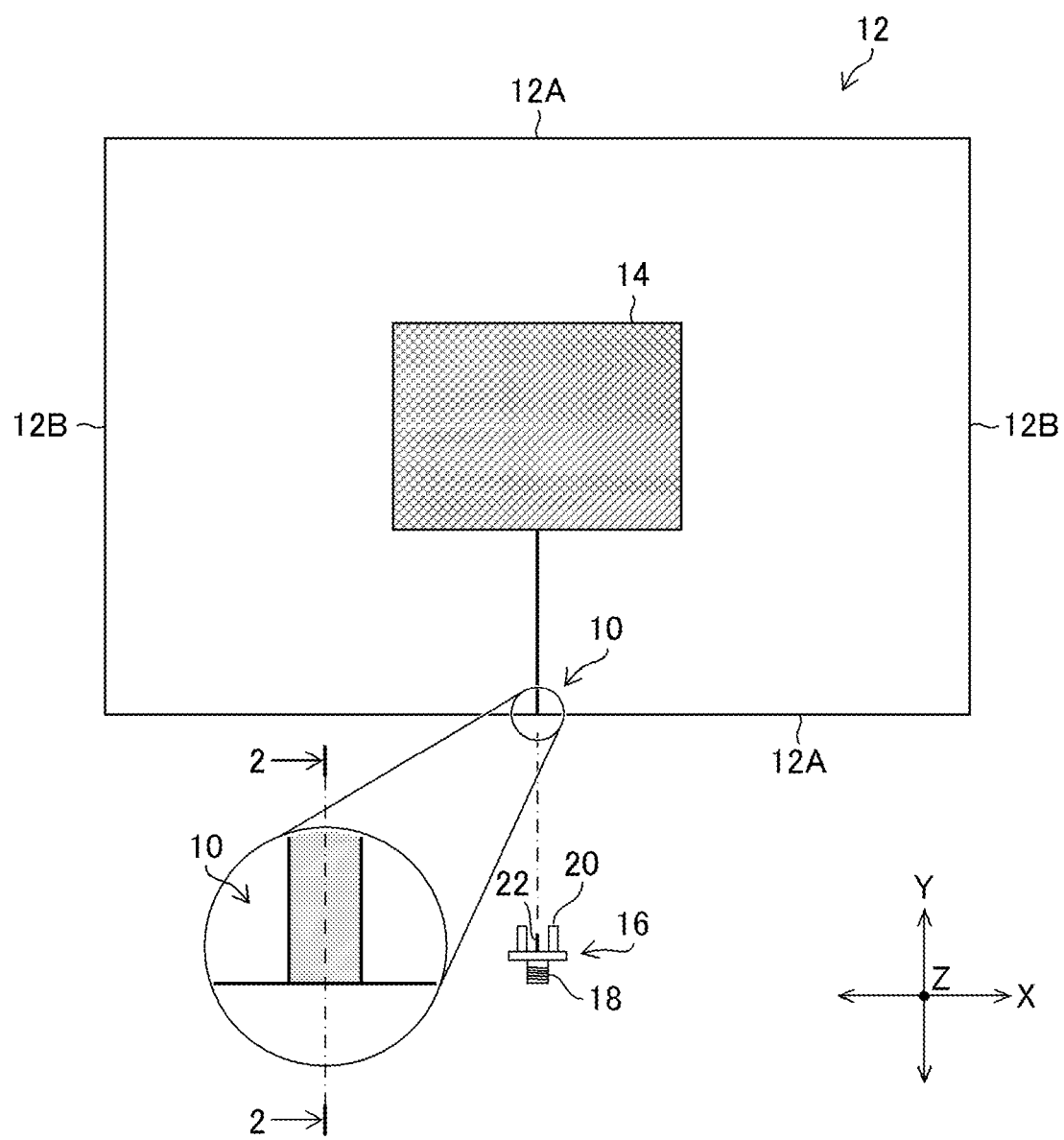
FIG. 1 is a plan view of an antenna unit having a laminated body with electric conductor according to a first embodiment.
Figure 2:
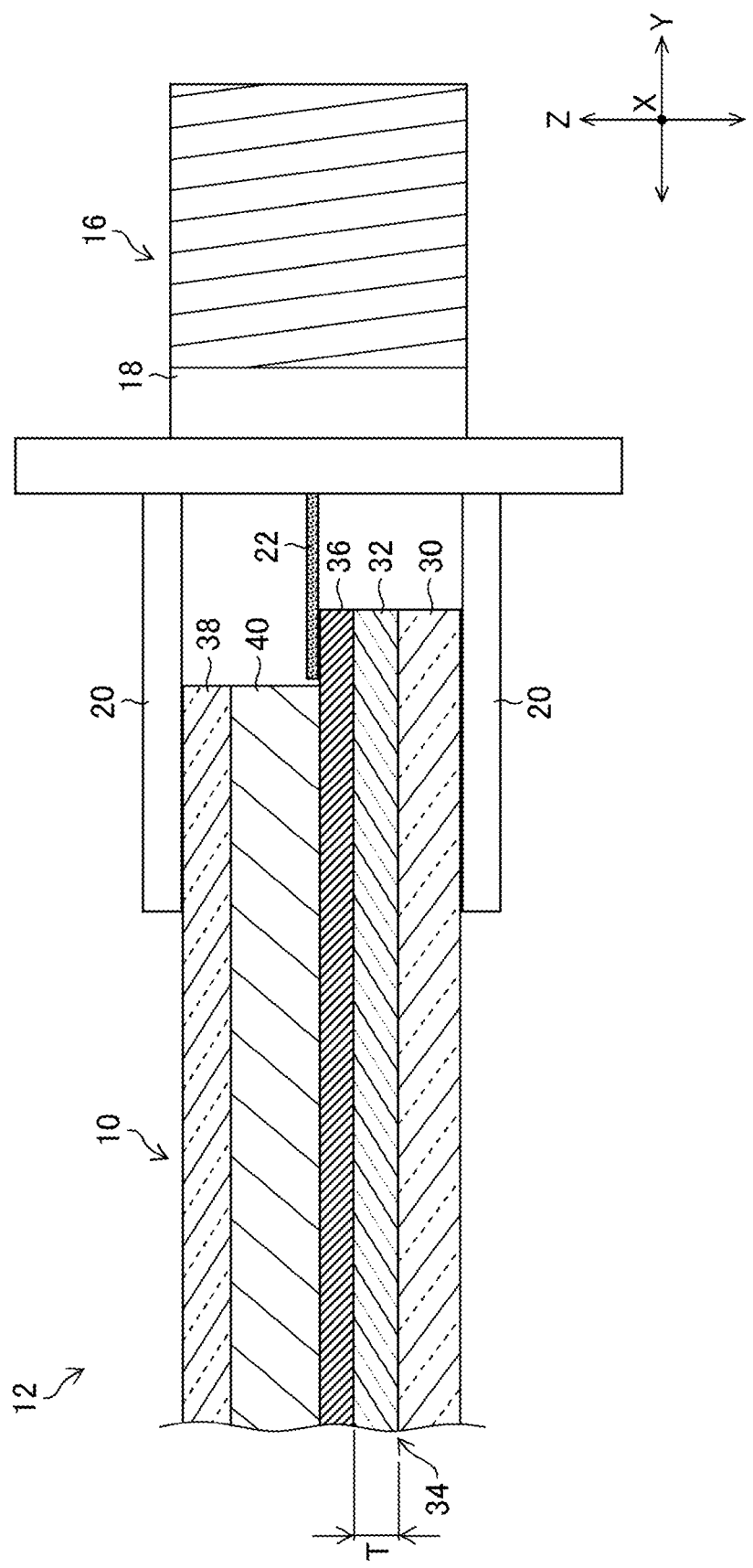
FIG. 2 is an enlarged cross-sectional view of a laminated body with electric conductor taken along the line 2-2 of FIG. 1.

FIG. 1 is a plan view of an antenna unit 12 having a laminated body with electric conductor 10 according to a first embodiment. FIG. 2 is an enlarged cross-sectional view of a laminated body with electric conductor 10 taken along the line 2-2 of FIG. 1.

In the following description, the scale of each member in the drawing may differ from the actual scale for ease of understanding. In the present specification, a three-dimensional orthogonal coordinate system in three axes (in the X-axis direction, the Y-axis direction, and the Z-axis direction) is used, with a direction parallel to the long sides 12A of the antenna unit 12 arranged in a rectangular shape as an overall shaped being set as the X-axis direction, a direction parallel to the short sides 12B perpendicular to the X-axis direction being set as the Y-axis direction, and a direction parallel to the thickness direction of the antenna unit 12 perpendicular to the X-axis direction and the Y-axis direction being set as the Z-axis direction. The overall shape of the antenna unit 12 is not limited to a rectangular shape, but rather is formed to suit the application.

The laminated body with electric conductor 10 as illustrated in FIG. 1 is applied to the transmission lines for connecting an antenna 14 and a connector 16 in the antenna unit 12 mainly formed of a glass plate. The applicable portion of the laminated body with electric conductor 10 is not limited to the transmission lines of the antenna 14, but is applicable to the high-frequency transmission lines used for transmitters or receivers other than the antenna 14. The antenna 14 is a member of the antenna unit 12. A conductive material, such as gold, silver, or copper, may be applied as the metallic material configuring the antenna 14. The antenna 14 is also preferably light transmissive. The light transmissive antenna 14 is preferably used because it is well designed and reduces an average solar absorptivity.

Figure 3:
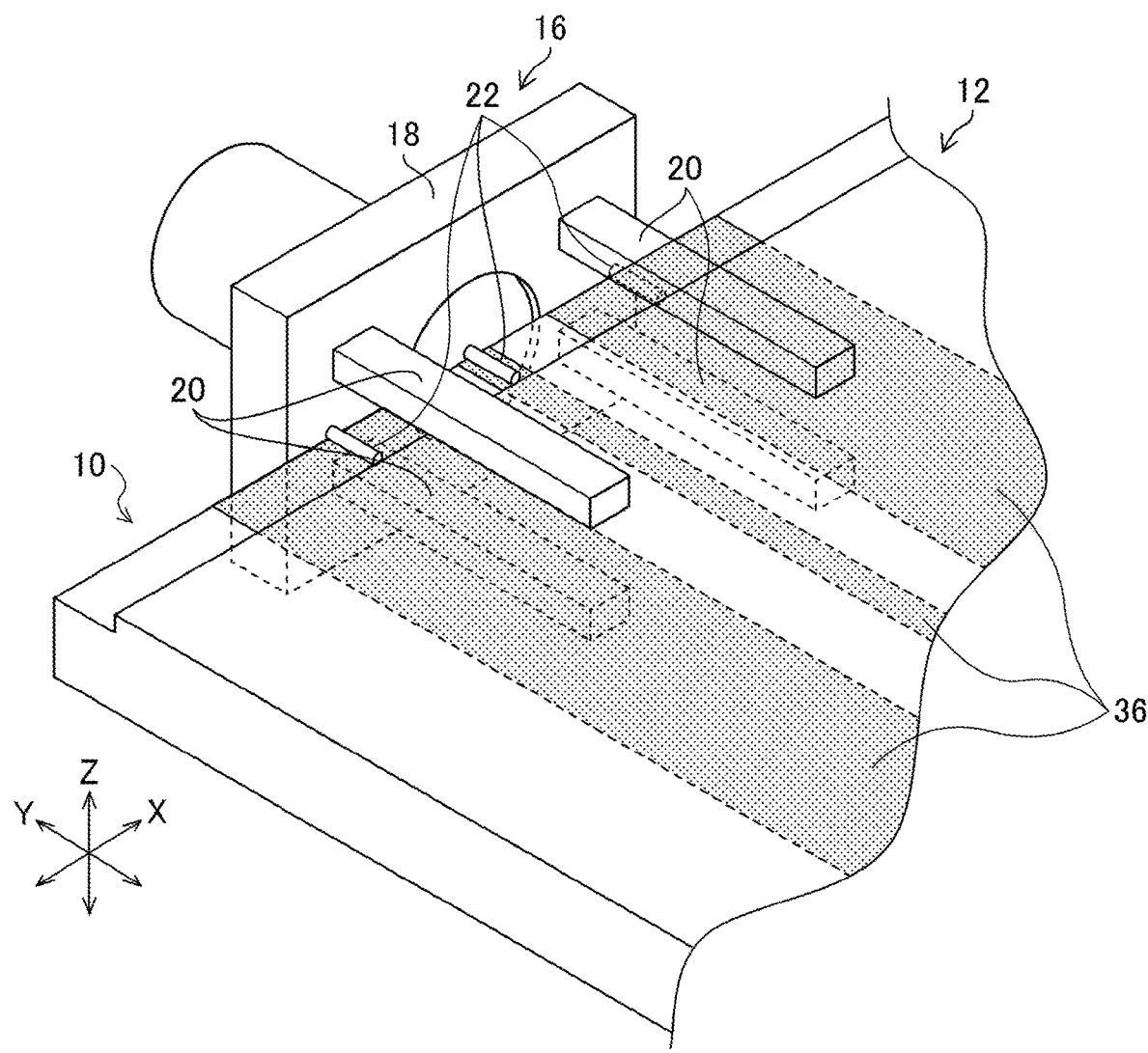
FIG. 3 is a perspective view of a main portion of the antenna unit.

The connector 16 is connected to an external device (not illustrated) for example via a coaxial cable (not illustrated) and is attached to the laminated body with electric conductor 10 located at the end of the antenna unit 12, as illustrated in the perspective view of the main portion of the antenna unit 12 illustrated in FIG. 3. As illustrated in FIG. 2, the connector 16 includes a connector body 18, two pairs of legs 20, (see FIG. 3) extending from the connector body 18 in a Y-axis direction to clamp the antenna unit 12 in a thickness direction (in the Z-axis direction), and conductive pins 22 extending from the connector body 18 in a Y-axis direction. When the connector 16 is mounted in the above-described position, the conductive pins 22 are connected to an electric conductor 36 of the laminated body with electric conductor 10. The electric conductor 36 will be described later.

The laminated body with electric conductor 10 illustrated in FIG. 2 includes the basic components of the second to fourth embodiments described below. In this configuration, a substrate 30, a functional layer 34 having at least an adhesive layer 32, an electric conductor 36, and a protective material 38 are sequentially laminated in the thickness direction (in the Z-axis direction), and the thickness T of the functional layer 34 is less than or equal to 0.300 mm.

For a specific configuration of the laminated body with electric conductor 10, a substrate used for high-frequency, antenna, or electronic applications is useable as the substrate 30. Also, for example, glass, resin, glass resin composite (e.g. fiber reinforced plastic), or ceramic is applicable as the substrate 30. The thickness of the substrate 30 is 0.5 mm to 10.0 mm, for example, preferably 2.5 mm to 5.0 mm, and more preferably 3.0 mm to 3.5 mm. The thickness of the substrate 30 can be selected based on the mechanical and electrical properties of the mounting. In the present specification, a glass plate is used as the substrate 30. In the present specification, a numerical value range expressed using "to" includes an upper limit value and a lower limit value.

Transparent inorganic glass is an example of a glass plate that may be used as the substrate 30. Examples of inorganic glass include conventional soda lime glass, borosilicate glass, alkali-free glass, quartz glass, and the like. The forming process is not particularly limited. Float glass plate manufactured by, for example, a float process can be used. Also, a colorless transparent material which does not contain coloring components may be used, or a colored transparent material which is colored may be used.

Examples of resins used in the substrate 30 include polyethylene terephthalate (PET), polyethylene, and polyimide.

The functional layer 34 mainly has an adhesive layer 32, and the electric conductor 36 is adhered to the substrate 30 via the adhesive layer 32. As illustrated in FIG. 2, when the functional layer 34 is formed by only the adhesive layer 32, the thickness of the functional layer 34 is preferably more than or equal to 0.010 mm and more preferably more than or equal to 0.020 mm. When the thickness of the functional layer 34 is more than or equal to 0.010 mm, sufficient mechanical strength (e.g., shear strength) is exhibited. In addition, the upper limit of the thickness of the functional layer 34 is not particularly limited. For example, the upper limit of the thickness of the functional layer may be less than or equal to 0.10 mm, less than or equal to 0.050 mm, or less than or equal to 0.030 mm. In the present embodiment, an optically clear adhesive is used as the adhesive layer 32. By using an optically clear adhesive as the adhesive layer 32, the adhesive layer 32 exhibits transparency and see-through qualities, and the design of the laminated body with electric conductor 10 is favorable. Examples of materials of the optically clear adhesive include a sheet-like material called Optically Clear Adhesive (OCA) such as acrylic, silicone, urethane, and the like.

An electric conductor formed by conductive materials such as gold, silver, copper, aluminum, chromium, molybdenum, or the like can be used as the electric conductor 36. The thickness of the electric conductor 36 is not particularly limited. An example of the thickness of the electric conductor is 0.002 mm to 0.020 mm. When the thickness of the electric conductor 36 is more than or equal to 0.002 mm, a low resistivity can be obtained that is suitable for high-frequency circuits including antennas. Further, when the thickness of the electric conductor 36 is less than or equal to 0.020 mm, patterning by etching or the like can be easily performed. In the present embodiment, a copper conductor is applied as the electric conductor 36.

The electric conductor 36 may be formed as a mesh. The "mesh" refers to a state in which a mesh-like permeable hole is formed in the plane of the electric conductor 36. By forming the electric conductor 36 in a mesh-like manner, the electric conductor 36 exhibits see-through qualities and translucency, and the design of the laminated body with electric conductor 10 is favorable.

When the electric conductor 36 is formed as a mesh, the openings of the mesh may be rectangle or diamond shaped. When the openings of the mesh are formed into rectangles, the openings of the mesh are preferably square. When the openings of the mesh are square, the design becomes favorable. The mesh may also be randomly shaped by a self-assembling method. A randomly shaped electric conductor can prevent it from forming a moiré pattern. The line width of the mesh is preferably 5 to 30 μm and more preferably 6 to 15 μm. The line space of the mesh is preferably 50 to 500 μm and more preferably 100 to 300 μm.

When the electric conductor 36 is formed as a mesh and the adhesive layer 32 is an optically clear adhesive, the thickness of the adhesive layer 32 is preferably thicker than the thickness of the electric conductor 36. When the thickness of the adhesive layer 32 is thicker than the thickness of the electric conductor 36, the optically clear adhesive can readily enter into the openings of the mesh, improving the transparency and see-through qualities of the laminated body with electric conductor 10. Also, the design of the laminated body with electric conductor 10 is favorable.

The percentage of openings in the electric conductor 36 is preferably higher than or equal to 80% and more preferably higher than or equal to 90%. The percentage of openings is a percentage of the area of the openings per area including the openings of the electric conductor 36.

The protective material 38 is a plate that protects the electric conductor 36 and is adhered to the electric conductor 36 via an interlayer 40, such as polyvinyl butyral, ethylene vinyl acetate, and the like. That is, according to the laminated body with electric conductor 10, the protective material 38 is laminated to the electric conductor 36 via the interlayer 40 to protect the electric conductor 36. It should be noted that the protective material 38 may be adhered to the electric conductor 36 not only by the interlayer 40 but also by other adhesives such as an optically clear adhesive. The thickness of the interlayer 40 when the interlayer 40 is used is, for example, 0.37 mm. Other adhesives such as interlayer 40 or optically clear adhesive and the like may also include ultraviolet light absorbing agents. The inclusion of an ultraviolet light absorbing agents prevents the functional layer 34 from being degraded due to ultraviolet light.

The protective material 38 may be, for example, glass such as soda lime glass, alkali-free glass, borosilicate glass; resins such as polyethylene terephthalate (PET), polyethylene, and the like; glass resin composites (e.g., fiber-reinforced plastic); or ceramics. The protective material 38 can prevent the functional layer 34 from being degraded due to ultraviolet light, humidity (moisture), and water, and can prevent the functional layer 34 from being damaged or destroyed through mechanical contact. The thickness of the protective material 38 is, for example, 0.05 mm to 5.0 mm. When the thickness of the protective material 38 is more than or equal to 0.05 mm, deterioration of the functional layer 34 described above and damage or destruction of the functional layer 34 through mechanical contact can be prevented. The thickness of the protective material 38 may be more than or equal to 0.10 mm, more than or equal to 0.50 mm, or more than or equal to 1.0 mm. Further, when the thickness of the protective material 38 is less than or equal to 5.0 mm, the effect of the impedance mismatch with air caused by the provision of the protective material can be suppressed. The thickness of the protective material 38 may be less than or equal to 3.0 mm and less than or equal to 2.0 mm. In the present embodiment, a glass plate is used as the protective material 38. The materials of the glass plate used for the protective material 38 is the same as the materials of the glass plate applied to the substrate 30, thus, the description thereof will be omitted.

A resin such as polyethylene terephthalate (PET), polyethylene, and the like having a thickness of 0.05 mm to 0.20 mm may also be used for the protective material 38.

Hereinafter, the laminated body with electric conductor 10 of the first embodiment and a conventional laminated body with electric conductor in which a conductor is adhered to a substrate by an interlayer will be compared.

The component of the laminated body with electric conductor 10 corresponding to a conventional interlayer is the functional layer 34. The thickness T of the functional layer 34 is 0.020 mm to 0.050 mm and is configured to be less than or equal to 0.300 mm, and thus the thickness of the functional layer 34 is thinner than the thickness of the interlayer (more than or equal to 0.37 mm) and the variation of the thickness of the functional layer is small. According to the laminated body with electric conductor 10 having the functional layer 34 in the first embodiment, the directivity of the radio waves of the high-frequency transmission is improved and the deviation in frequency can be suppressed compared to the conventional laminated body with electric conductor having the interlayer, and thus, sufficient high-frequency transmission characteristics can be obtained.

When an interlayer is used as an adhesive, the interlayer may become stretched, causing a sagging at the end of the interlayer (a portion that is inclined with respect to the surface of the substrate), extending from the end of the substrate, or shrinking inward from the end of the substrate. A connectivity issue between the conductor and the conductive pins 22 may arise when such sagging, hanging out, or inward shrinking occurs. However, when an optically clear adhesive is used as the adhesive layer 32 as in the present embodiment, the adhesive layer 32 does not become stretched, and therefore, the electric conductor 36 and the conductive pins 22 can be securely connected.

Figure 4:
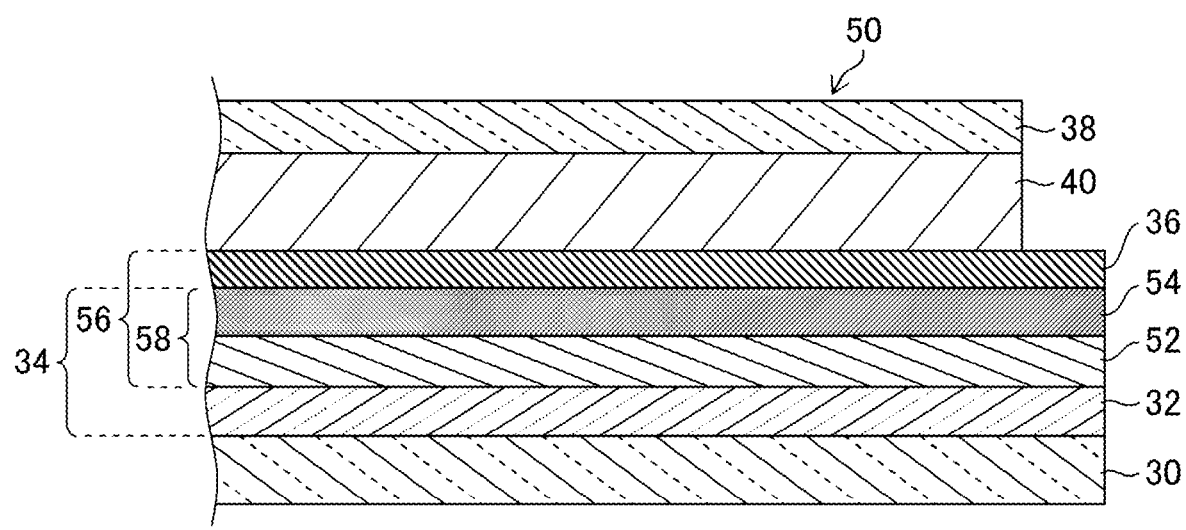
FIG. 4 is an enlarged cross-sectional view of the main portion of the laminated body with electric conductor according to a second embodiment.

FIG. 4 is an enlarged cross-sectional view of a main portion of the laminated body with electric conductor 50 in the second embodiment. In describing the laminated body with electric conductor 50, members identical to or similar to the laminated body with electric conductor 10 in the first embodiment described in FIG. 2 will be described with the same reference numerals.

A laminated body with electric conductor 50 illustrated in FIG. 4 includes an electric conductor 36 having a thickness of less than or equal to 20 μm (e.g., 10 μm). When such a thin electric conductor 36 is used, it is difficult to directly adhere the electric conductor 36 to a substrate 30 using an adhesive layer 32 to pattern the form of transmission lines. Thus, in such a case, a laminated body 56 is used in which the electric conductor 36 is adhered to a resin plate 52 by an adhesive 54. The electric conductor 36 is patterned in the form of transmission lines in the laminated body 56, and the resin plate 52 is then adhered to the substrate 30 using the adhesive layer 32. When the electric conductor 36 is less than 10 μm (e.g., 5 μm), the resin plate 52 may be provided directly, such as by deposition of the electric conductor 36, instead of using the adhesive 54. The laminated body with electric conductor 50 in the second embodiment includes the functional layer 34 including the adhesive layer 32, the resin plate 52, and the adhesive 54, and includes a reinforcement layer 58 to the electric conductor 36 by the resin plate 52 and the adhesive 54.

Resin plates made by polyethylene terephthalate, polyethylene, or polyimide having a thickness of 0.05 mm to 0.20 mm can be used as the resin plate 52. In the present embodiment, a polyethylene terephthalate plate having a thickness of 0.10 mm was used. A temperature of the resin plate 52 becomes high during the manufacturing process of the laminated body with electric conductor 50 when the laminated body with electric conductor 50 has an interlayer 40 between the electric conductor 36 and the protective material 38. The resin plate 52 is preferably a material having a high melting point and high heat resistance so as not to deform at a high temperature. The material is preferably polyethylene terephthalate (melting point is about 225° C.) and more preferably polyimide. Examples of the adhesive 54 include an acrylic adhesive having a thickness of 0.005 mm to 0.02 mm (e.g., 0.01 mm). In addition, the adhesive 54 may include a silicone-based adhesive and a urethane-based material adhesive.

The thickness of the reinforcement layer 58 is preferably 0.06 mm to 0.22 mm.

The thickness of the functional layer 34 formed by the adhesive layer 32, the resin plate 52, and the adhesive 54 is, for example, 0.135 mm in the laminated body with electric conductor 50 of the second embodiment. The thickness of the functional layer is less than or equal to 0.300 mm, which is thinner than the thickness of the interlayer (more than or equal to 0.37 mm), and thus the variation of the thickness of the functional layer is small. According to the laminated body with electric conductor 50 in the second embodiment, the directivity of the radio waves of the high-frequency transmission improves and the deviation in frequency can be suppressed compared to the conventional laminated body with electric conductor having the interlayer, and thus, sufficient high-frequency transmission characteristics can be obtained.

Figure 5:
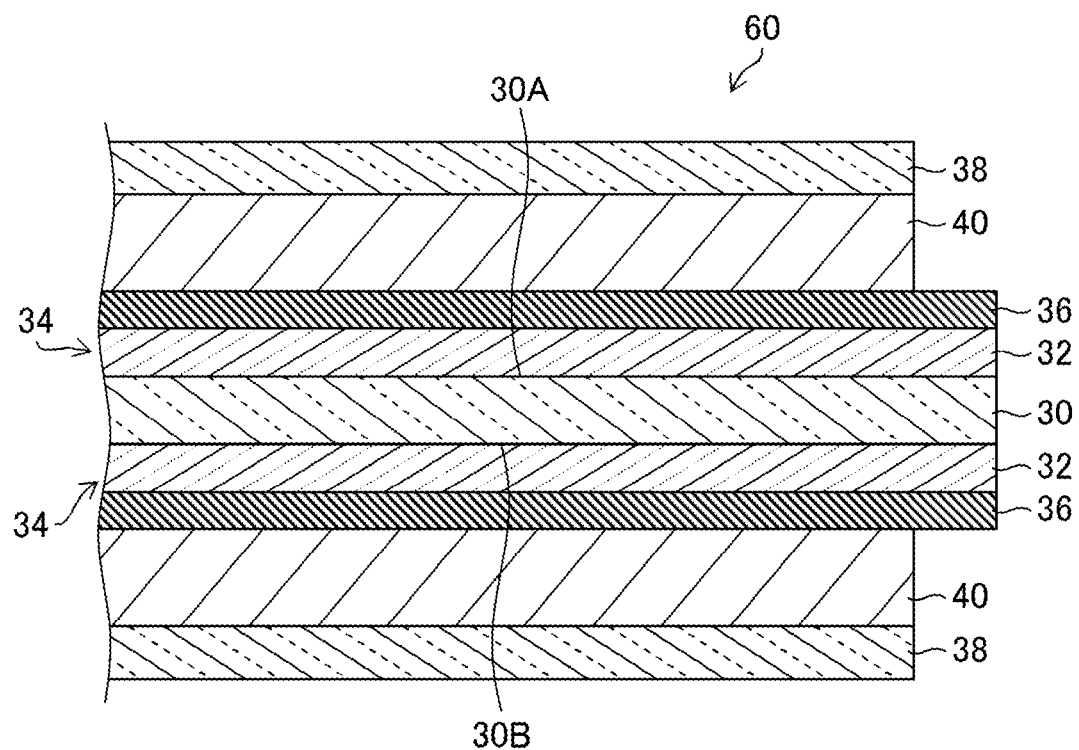
FIG. 5 is an enlarged cross-sectional view of the main portion of the laminated body with electric conductor according to a third embodiment.
Figure 5:
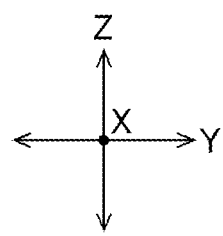

FIG. 5 is an enlarged cross-sectional view of main portion of the laminated body with electric conductor 60 in the third embodiment. In describing the laminated body with electric conductor 60, members identical to or similar to the laminated body with electric conductor 10 in the first embodiment described in FIG. 2 will be described with the same reference numerals.

In a laminated body with electric conductor 60, a functional layer 34 (corresponding to the first functional layer of the present invention) having at least an adhesive layer 32 (corresponding to the first adhesive layer of the present invention), an electric conductor 36 (corresponding to the first electric conductor of the present invention), and a protective material (corresponding to the first protective material of the present invention) are sequentially laminated in the thickness direction on a front surface 30A (corresponding to the first surface of the present invention) of a substrate 30. Further, a functional layer 34 (corresponding to the second functional layer of the present invention) having at least an adhesive layer 32 (corresponding to the second adhesive layer of the present invention), an electric conductor 36 (corresponding to the second electric conductor of the present invention), and a protective material 38 (corresponding to the second protective material of the present invention) are sequentially laminated in the thickness direction on the back surface 30B (corresponding to the second surface of the present invention) of the substrate 30. Each functional layer 34 is configured to have a thickness of less than or equal to 0.300 mm.

Further, the thickness of each functional layer is 0.020 mm to 0.030 mm and preferably 0.025 mm, because the functional layers 34 of the laminated body with electric conductor 60 are formed by only the adhesive layers 32.

The thickness of each functional layer 34 of the laminated body with electric conductor 60 in the third embodiment is also, for example, 0.025 mm, which is less than or equal to 0.300 mm. Therefore, sufficient high-frequency transmission characteristics can be obtained as in the first and second embodiments of the laminated body with electric conductors 10 and 50.

Figure 6:
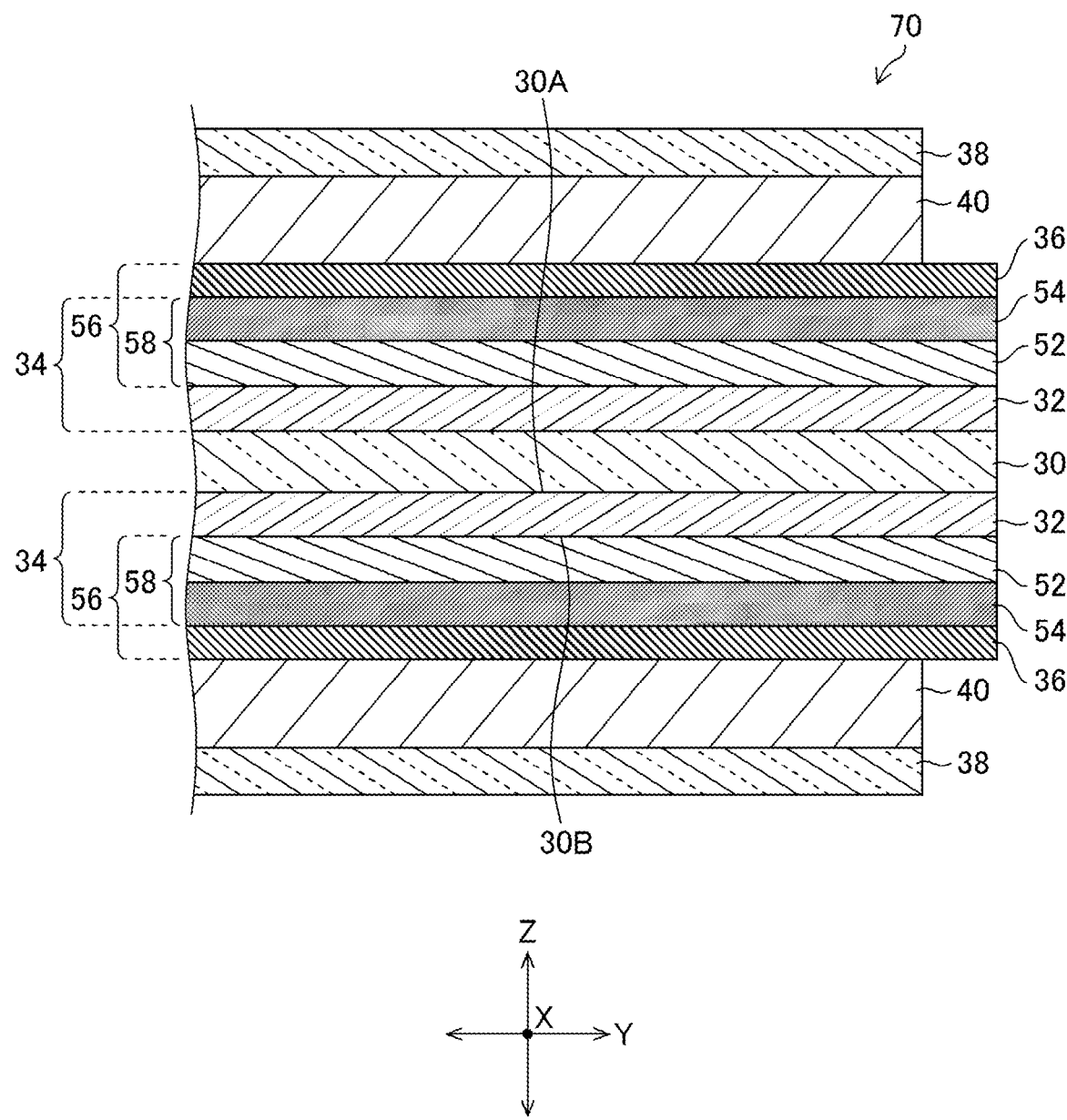
FIG. 6 is an enlarged sectional view of the main portion the laminated body with electric conductor according to a fourth embodiment.

FIG. 6 is an enlarged cross-sectional view of a main portion of the laminated body with electric conductor 70 in the fourth embodiment. In describing the laminated body with electric conductor 70, members identical to or similar to the laminated body with electric conductor 50 in the second embodiment described in FIG. 4 and the laminated body with electric conductor 60 in the third embodiment described in FIG. 5 will be described with the same reference numerals.

A laminated body with electric conductor 70 includes a functional layer 34 on the front surface 30A of the substrate 30. The functional layer 34 includes an adhesive layer 32 and a reinforcement layer 58 (corresponding to the first reinforcement layer of the present invention) formed by a resin plate 52 and an adhesive 54. Further, a functional layer 34 is also provided on the back surface 30B of the substrate 30. The functional layer 34 includes an adhesive layer 32 and a reinforcement layer 58 (corresponding to the second reinforcement layer of the present invention) formed by a resin plate 52 and an adhesive 54. A thickness of the first functional layer is less than or equal to 0.300 mm and a thickness of the second functional layer is less than or equal to 0.300 mm.

The thickness of the functional layer 34 formed by the adhesive layer 32, the resin plate 52, and the adhesive 54 in the laminated body with electric conductor 70 in the fourth embodiment is, for example, 0.135 mm, which is less than or equal to 0.300 mm. Therefore, sufficient high-frequency transmission characteristics can be obtained as in the first to third embodiments of the laminated body with electric conductors 10, 50, and 60.

Although the preferred embodiment has been described in detail above, various modifications and substitutions can be made to the above-described embodiment without departing from the scope of the claims.

DESCRIPTION OF THE REFERENCE NUMERALS

10 Laminated body with electric conductor
12 Antenna unit
14 Antenna
16 Connector
18 Connector body
20 Legs
22 Conductive pins
30 Substrate
30A Front surface
30B Back surface
32 Adhesive layer
34 Functional layer
36 Electric conductor
38 Protective material
40 Interlayer
50 Laminated body with electric conductor
52 Resin plate
54 Adhesive
56 Laminated body
58 Reinforcement layer
60 Laminated body with electric conductor
70 Laminated body with electric conductor

The invention claimed is:
1. A laminated body with electric conductor comprising:
a substrate;
a functional layer having at least an adhesive layer;
an electric conductor; and a protective material, wherein the protective material is a glass plate, wherein the substrate, the functional layer having at least the adhesive layer, the electric conductor, and the protective material are sequentially laminated in a thickness direction, and wherein a thickness of the functional layer is less than or equal to 0.300 mm.

2. A laminated body with electric conductor comprising:
a substrate;
a functional layer comprising an adhesive layer and a reinforcement layer to reinforce an electric conductor; and
a protective material,
wherein the substrate, the functional layer having at least the adhesive layer, the electric conductor, and the protective material are sequentially laminated in a thickness direction, and
wherein a thickness of the functional layer is less than or equal to 0.300 mm.

3. The laminated body with electric conductor according to claim 2, wherein a thickness of the reinforcement layer is more than or equal to 0.06 mm.

4. The laminated body with electric conductor according to claim 2, wherein the adhesive layer is an optically clear adhesive.

5. The laminated body with electric conductor according to claim 2, wherein the substrate is a glass plate.

6. The laminated body with electric conductor according to claim 2, wherein the substrate is a resin.

7. The laminated body with electric conductor according to claim 2, wherein the protective material is a glass plate.

8. The laminated body with electric conductor according to claim 2, wherein the protective material is a resin.

9. A laminated body with electric conductor comprising:
a substrate having a first surface as a front surface and a second surface as a back surface;
a first functional layer having at least a first adhesive layer;
a first electric conductor;
a first protective material;
a second functional layer having at least a second adhesive layer;
a second electric conductor; and
a second protective material,
wherein the first functional layer having at least the first adhesive layer, the first electric conductor, and the first protective material are sequentially laminated in a thickness direction to the first surface of the substrate,
wherein the second functional layer having at least the second adhesive layer, the second electric conductor, and the second protective material are sequentially laminated in a thickness direction to the second surface of the substrate, and
wherein a thickness of the first functional layer is less than or equal to 0.300 mm and a thickness of the second functional layer is less than or equal to 0.300 mm.

10. The laminated body with electric conductor according to claim 9, wherein
the first functional layer comprises the first adhesive layer and a first reinforcement layer to reinforce the first electric conductor, and
the second functional layer comprises the second adhesive layer and a second reinforcement layer to reinforce the second electric conductor.

11. The laminated body with electric conductor according to claim 9, wherein the first adhesive layer and the second adhesive layer are optically clear adhesives.

12. The laminated body with electric conductor according to claim 9, wherein the substrate is a glass plate.

13. The laminated body with electric conductor according to claim 9, wherein the substrate is a resin.

14. The laminated body with electric conductor according to claim 9, wherein the first protective material and the second protective material are glass plates.

15. The laminated body with electric conductor according to claim 9, wherein the first protective material and the second protective material are resins.

16. A laminated body with electric conductor comprising:
a substrate;
a functional layer having at least an adhesive layer, wherein the adhesive layer is an optically clear adhesive;
an electric conductor; and
a protective material,
wherein the substrate, the functional layer having at least the adhesive layer, the electric conductor, and the protective material are sequentially laminated in a thickness direction, and
wherein a thickness of the functional layer is less than or equal to 0.300 mm.

* * * * *